(12) United States Patent
Yoshimura et al.

(10) Patent No.: US 12,541,987 B2
(45) Date of Patent: Feb. 3, 2026

(54) PARAMETER SET OPTIMIZATION APPARATUS, PARAMETER SET OPTIMIZATION PROGRAM, AND PAPER SHEET HANDLING SYSTEM

(71) Applicants: FUJITSU FRONTECH LIMITED, Tokyo (JP); Fujitsu Frontech Systems Limited, Maebashi (JP)

(72) Inventors: Kazuhisa Yoshimura, Inagi (JP); Masami Kamei, Inagi (JP)

(73) Assignees: FUJITSU FRONTECH LIMITED, Tokyo (JP); FUJITSU FRONTECH SYSTEMS LIMITED, Gunma (JP)

( * ) Notice: Subject to any disclaimer, the term of this patent is extended or adjusted under 35 U.S.C. 154(b) by 248 days.

(21) Appl. No.: 18/163,455

(22) Filed: Feb. 2, 2023

(65) Prior Publication Data

US 2023/0186663 A1    Jun. 15, 2023

Related U.S. Application Data

(63) Continuation of application No. PCT/JP2020/032825, filed on Aug. 31, 2020.

(51) Int. Cl.
*G06V 30/19* (2022.01)
*G06N 3/126* (2023.01)

(52) U.S. Cl.
CPC ......... *G06V 30/1908* (2022.01); *G06N 3/126* (2013.01); *G06V 30/19093* (2022.01)

(58) Field of Classification Search
CPC ......... G06V 30/1908; G06V 30/19093; G06N 3/126
See application file for complete search history.

(56) References Cited

U.S. PATENT DOCUMENTS

| | | | |
|---|---|---|---|
| 2012/0189186 A1* | 7/2012 | Csulits | G07D 11/50 382/135 |
| 2021/0149962 A1* | 5/2021 | Yin | G06F 16/5846 |

FOREIGN PATENT DOCUMENTS

| | | | | |
|---|---|---|---|---|
| CN | 102902964 A | | 1/2013 | |
| CN | 110413774 A | * | 11/2019 | ............ G06N 3/126 |
| EP | 2682901 A1 | * | 1/2014 | ........... G06V 30/147 |
| JP | 2005-253031 A | | 9/2005 | |

(Continued)

OTHER PUBLICATIONS

Extended European Search Report mailed on Aug. 4, 2023 for European Patent Application No. 20951559.2.

(Continued)

*Primary Examiner* — Wednel Cadeau
(74) *Attorney, Agent, or Firm* — STAAS & HALSEY LLP

(57) ABSTRACT

A serial number recognition parameter determination apparatus includes: a generation unit, an identification unit, and an evaluation index calculation unit. The generation unit generates a parameter set of a program, the program being used when a paper sheet handing apparatus identifies, from an image of a paper sheet, character present regions in which characters that form a serial number are present. The identification unit identifies, from an image of the paper sheet, the character present regions by using the parameter set that is generated by the generation unit. The evaluation index calculation unit calculates an evaluation index of the parameter set based on the character present regions that are identified by the identification unit.

4 Claims, 20 Drawing Sheets

(56) References Cited

FOREIGN PATENT DOCUMENTS

| | | |
|---|---|---|
| JP | 2016-031574 A | 3/2016 |
| JP | 2016-118925 A | 6/2016 |
| JP | 2016-206839 A | 12/2016 |
| JP | 2018-60389 A | 4/2018 |
| WO | WO2020/084720 A1 | 4/2020 |

OTHER PUBLICATIONS

Office Action dated Mar. 14, 2024 issued by The Patent Office of Intellectual Property India for corresponding Application No. 202337005820 in India.
International Search Report, dated Nov. 10, 2020, in corresponding International Patent Application No. PCT/JP2020/032825 (4 pp.).
Chinese Office Action dated Feb. 12, 2025 for Chinese Application No. 202080103313.3.
Chinese Office Action dated Jun. 23, 2025 for the corresponding Chinese patent application No. 202080103313.3.

* cited by examiner

| PARAMETER | DESCRIPTION |
|---|---|
| TH1 | BINARIZATION THRESHOLD |
| BTYPE | BINARIZATION TYPE |
| DPXL | DILATION AMOUNT |
| THR | BLACK-TO-WHITE RATIO THRESHOLD |
| UDLR | OUTER EDGE DESIGNATION FOR EXCLUDING CANDIDATES AT EDGE OF SERIAL NUMBER PRESENT REGION IMAGE |
| THX | X-DISTANCE THRESHOLD |
| THY | Y-DISTANCE THRESHOLD |

FIG.21

| INDIVIDUAL A | XA0 | XA1 | XA2 | XA3 | XA4 | XA5 | XA6 | XA7 |
|---|---|---|---|---|---|---|---|---|
| INDIVIDUAL B | XB0 | XB1 | XB2 | XB3 | XB4 | XB5 | XB6 | XB7 |
| INDIVIDUAL C | XC0 | XC1 | XC2 | XC3 | XC4 | XC5 | XC6 | XC7 |
| INDIVIDUAL D | XD0 | XD1 | XD2 | XD3 | XD4 | XD5 | XD6 | XD7 |
| INDIVIDUAL E | XE0 | XE1 | XE2 | XE3 | XE4 | XE5 | XE6 | XE7 |

N=7, D=21, W=128

N=10, D=20, W=185

(a) EARLY GENERATION (b) LAST GENERATION

PARAMETER SET OPTIMIZATION APPARATUS, PARAMETER SET OPTIMIZATION PROGRAM, AND PAPER SHEET HANDLING SYSTEM

CROSS-REFERENCE TO RELATED APPLICATION

This application is a continuation application of International Application PCT/JP2020/032825, filed on Aug. 31, 2020, and designating the U.S., the entire contents of which are incorporated herein by reference.

FIELD

The present invention relates to a serial number recognition parameter determination apparatus, a serial number recognition parameter determination program, and a paper sheet handling system.

BACKGROUND

A paper sheet handling apparatus that handles paper sheets, such as paper currencies or cash vouchers, has a function to recognize a serial number that is written in a received paper sheet. The recognized serial number is used to determine whether the serial number is a specific number or to track the paper sheet, for example.

Meanwhile, as the conventional technology, a paper currency identification apparatus is known that is able to effectively determine authenticity of a paper currency. The paper currency identification apparatus acquires an image from a paper currency that is conveyed through a conveying path, identifies a serial number region in the acquired image, and determines the authenticity of the paper currency by determining whether a first character in the serial number region conforms to a rule that is determined in advance.

Further, as the conventional technology, a medium recognition apparatus is known that reduces a data amount when storing image data of an identification information part of a medium. The medium recognition apparatus acquires an image picture by capturing an image of a medium, recognizes medium identification information on the medium from the acquired image picture, and calculates reliability of a recognition result with respect to the recognized medium identification information. Furthermore, the medium recognition apparatus acquires a character region image of a character included in the medium identification information from the image picture, and performs a conversion process of converting the acquired character region image to an image with resolution that is based on the calculated reliability.

Moreover, as the conventional technology, a paper sheet recognition apparatus is known that does not degrade character recognition performance even when dirt or print misalignment is present. The paper sheet recognition apparatus captures an image of identification information that is added to a paper sheet, extracts an entire image of the identification information included in the captured image, further extracts a region of a digit in each piece of identification information in the extracted entire region, and recognizes the identification information in the extracted region. Furthermore, the paper sheet recognition apparatus determines whether at least one of or both of a maximum size of the extracted region and a maximum size of the recognized identification information falls/fall within a maximum size range that is determined in advance. Moreover, when it is determined that the maximum size is out of the range, the paper sheet recognition apparatus re-extracts and re-recognizes a region that is estimated as the digit and that has the maximum size.

Patent Literature 1: Japanese Laid-open Patent Publication No. 2016-118925

Patent Literature 2: Japanese Laid-open Patent Publication No. 2016-206839

Patent Literature 3: Japanese Laid-open Patent Publication No. 2016-031574

The serial number recognition program for recognizing the serial number written in the paper sheet is individually generated for each recognition target to improve recognition performance and reduce a processing time. For example, the serial number recognition program is individually generated for each country. Therefore, there is a problem in that man-hours needed to develop the serial number recognition program increase.

SUMMARY

According to an aspect of an embodiment, a serial number recognition parameter determination apparatus includes: a generation unit, an identification unit, and an evaluation index calculation unit. The generation unit generates a parameter set of a program, the program being used when a paper sheet handing apparatus identifies, from an image of a paper sheet, character present regions in which characters that form a serial number are present. The identification unit identifies, from an image of the paper sheet, the character present regions by using the parameter set that is generated by the generation unit. The evaluation index calculation unit calculates an evaluation index of the parameter set based on the character present regions that are identified by the identification unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 21 is a diagram illustrating an example of individuals.

DESCRIPTION OF EMBODIMENTS

Embodiments of a serial number recognition parameter determination apparatus, a serial number recognition parameter determination program, and a paper sheet handling system disclosed in the present application will be described in detail below based on the drawings. Meanwhile, the embodiments do not limit the disclosed technology.

Embodiment

Configuration of Paper Currency Handling Apparatus

Figure 1:
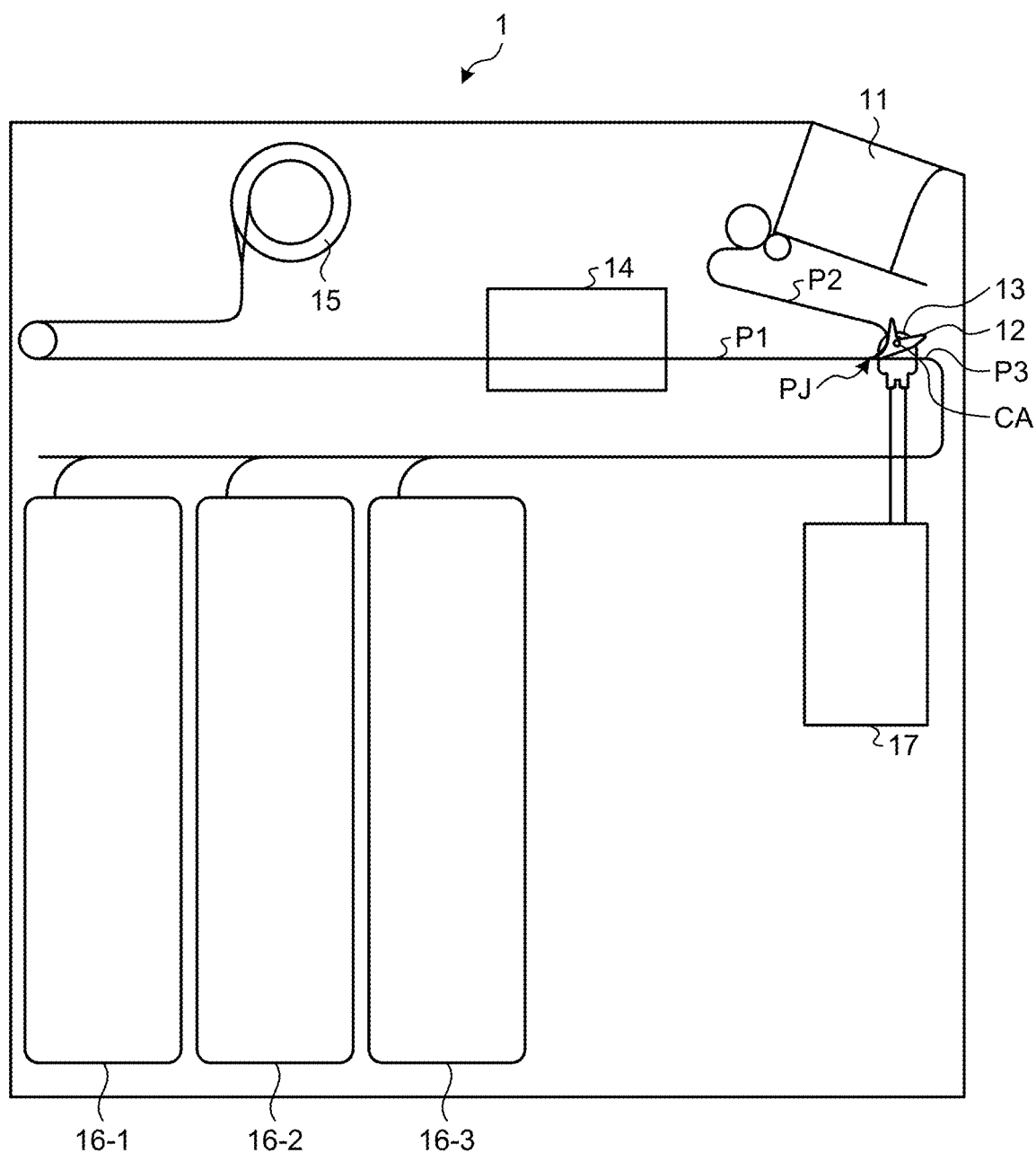
FIG. 1 is a diagram illustrating a configuration example of a paper currency handling apparatus according to an embodiment.

FIG. 1 is a diagram illustrating a configuration example of a paper currency handling apparatus according to the embodiment. FIG. 1 is a side sectional view. In FIG. 1, a paper currency handling apparatus 1 includes a cash slot 11, a switching claw 12, a solenoid 13, a paper currency inspection apparatus 14, a temporary hold unit 15, stackers 16-1, 16-2, and 16-3, a control unit 17, and conveying paths P1, P2, and P3.

Further, in the paper currency handling apparatus 1, a conveying path branch point PJ at which the conveying path P1 is branched into the two conveying paths P2 and P3 is present. In the paper currency handling apparatus 1, the conveying path P1 and one of the conveying paths P2 and P3 are connected to each other via the conveying path branch point PJ, so that a conveying path connection form is switched between a form (hereinafter, may be referred to as a "connection form C1") in which the conveying path P1 and the conveying path P2 are connected to each other and a form (hereinafter, may be referred to as a "connection form C2") in which the conveying path P1 and the conveying path P3 are connected to each other. When the conveying path connection form is set to the connection form C1, the conveying path P1 and the conveying path P2 form a continuous conveying path, and when the conveying path connection form is set to the connection form C2, the conveying path P1 and the conveying path P3 form a continuous conveying path.

A central axis CA of the switching claw 12 is connected to the solenoid 13, and the switching claw 12 is caused to rotate about the central axis CA by the solenoid 13. The switching claw 12 and the solenoid 13 are arranged in the vicinity of the conveying path branch point PJ, and the switching claw 12 is caused to rotate by the solenoid 13, so that the conveying path connection form is switched between the connection form C1 and the connection form C2. The conveying path connection form is switched under the control of the control unit 17.

Figure 2:
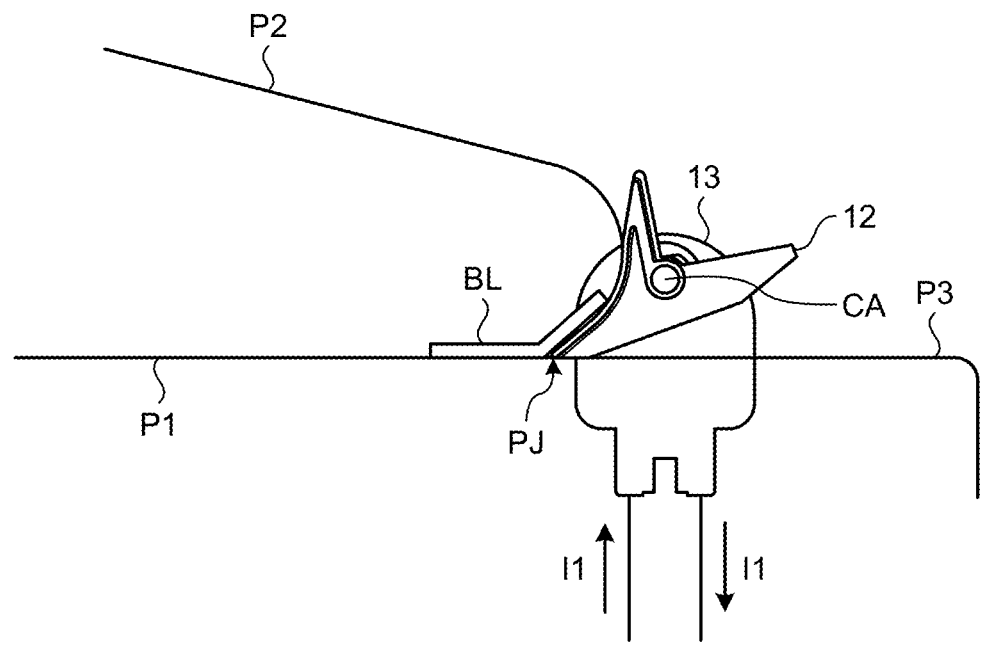
FIG. 2 is a diagram illustrating an example of a conveying path connection form according to the embodiment.
Figure 3:
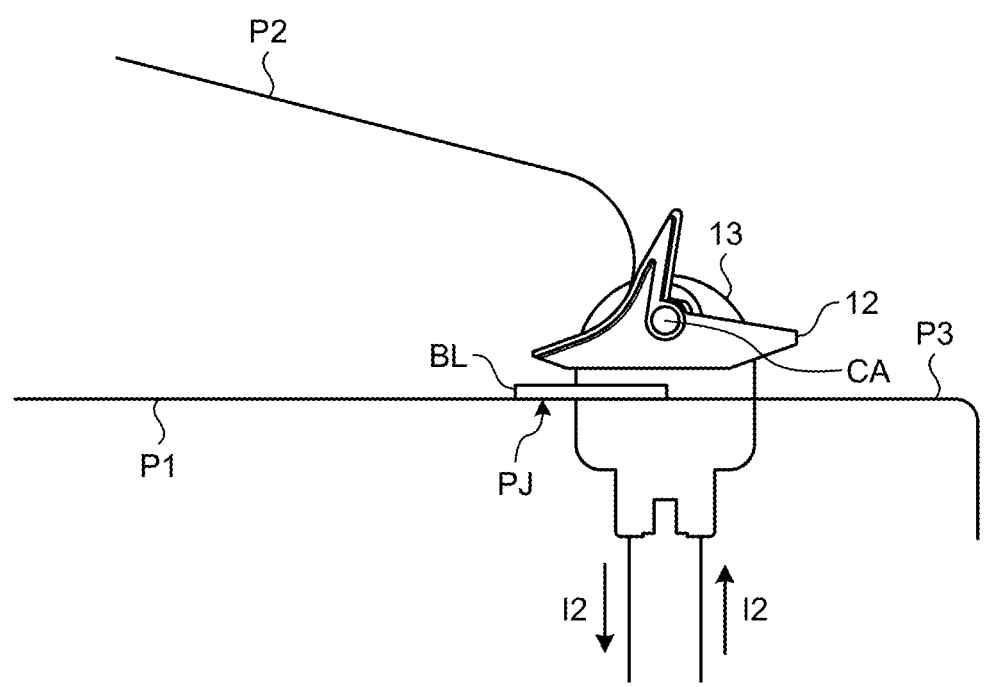
FIG. 3 is a diagram illustrating an example of the conveying path connection form according to the embodiment.

FIG. 2 and FIG. 3 are diagrams illustrating an example of the conveying path connection form according to the embodiment. FIG. 2 illustrates a case in which the conveying path connection form is set to the connection form C1, and FIG. 3 illustrates a case in which the conveying path connection form is set to the connection form C2.

As illustrated in FIG. 2, if an electric current I1 flows through the solenoid 13, the switching claw 12 rotates about the central axis CA in a left-handed direction (counterclockwise direction) and a left edge of the switching claw 12 comes into contact with the conveying path branch point PJ, so that the conveying path connection form is set to the connection form C1.

When the conveying path connection form is set to the connection form C1, a paper currency BL that is inserted in the cash slot 11 passes through the conveying path P2, is turned in the opposite direction along the left side of the switching claw 12, is conveyed to the paper currency inspection apparatus 14 through the conveying path P1, and is inspected by the paper currency inspection apparatus 14. The inspected paper currency BL is further conveyed through the conveying path P1 and is temporarily stored in the temporary hold unit 15.

If the paper currency inspection apparatus 14 fails to identify denomination or recognize a serial number and an inspection result indicates "NG", the conveying path connection form is maintained as the connection form C1, the paper currency BL that is temporarily stored in the temporary hold unit 15 is discharged from the temporary hold unit 15, passes through the conveying path P1, is turned in the opposite direction along the left side of the switching claw 12 at the conveying path branch point PJ, and is returned to the cash slot 11 through the conveying path P2.

If the paper currency inspection apparatus 14 succeeds in identifying the denomination and recognizing the serial number and the inspection result indicates "OK", as illustrated in FIG. 3, an electric current I2 in the opposite direction of the electric current I1 flows through the solenoid 13, the switching claw 12 rotates about the central axis CA in a right-handed direction (clockwise direction), and the left edge of the switching claw 12 is separated from the conveying path branch point PJ, so that the conveying path connection form is set to the connection form C2.

When the conveying path connection form is set to the connection form C2, the paper currency BL that is temporarily stored in the temporary hold unit 15 is discharged from the temporary hold unit 15, passes through the conveying path P1, enters the conveying path P3 while passing by the conveying path branch point PJ, is conveyed through the conveying path P3, and is stored in any of the stackers 16-1, 16-2, and 16-3 in accordance with the identified denomination. For example, ten thousand yen bills are stored in the stacker 16-1, five thousand yen bills are stored in the stacker 16-2, and thousand yen bills are stored in the stacker 16-3.

Configuration of Paper Currency Inspection Apparatus

Figure 4:
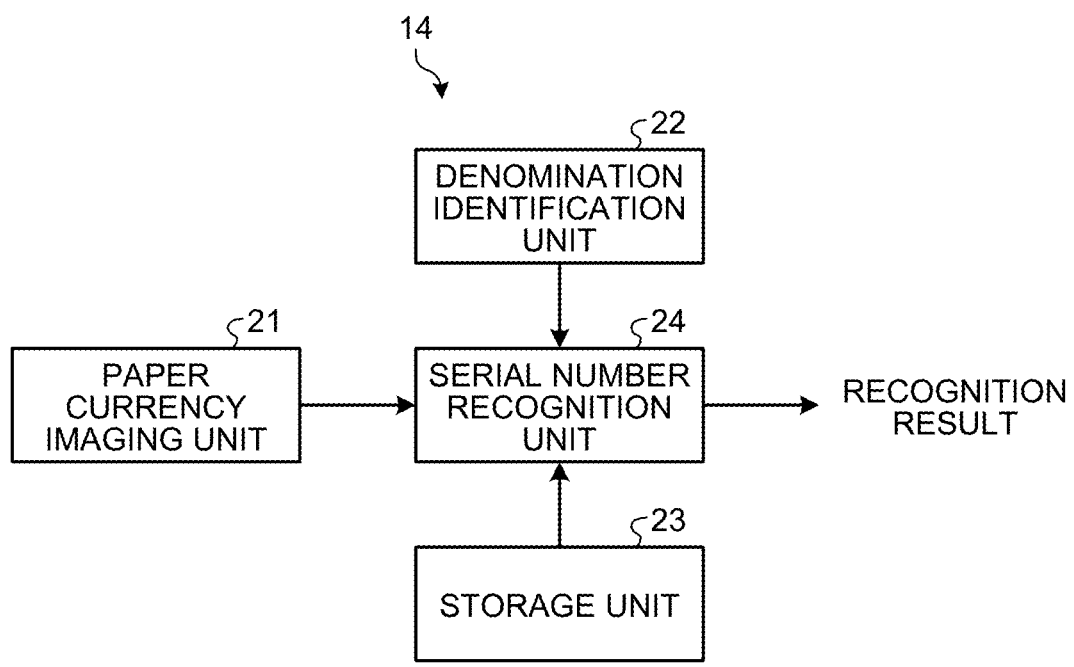
FIG. 4 is a diagram illustrating a configuration example of a paper currency inspection apparatus according to the embodiment.

FIG. 4 is a diagram illustrating a configuration example of the paper currency inspection apparatus according to the embodiment. In FIG. 4, the paper currency inspection apparatus 14 includes a paper currency imaging unit 21, a denomination identification unit 22, a serial number recognition unit 24, and a storage unit 23.

The paper currency imaging unit 21 captures an image of the paper currency BL that is conveyed to the paper currency inspection apparatus 14, and outputs a captured image BLP (hereinafter, may be referred to as a "paper currency image") of the paper currency BL to the serial number recognition unit 24.

The denomination identification unit 22 identifies the denomination of the paper currency BL that is conveyed to the paper currency inspection apparatus 14, and outputs information (hereinafter, may be referred to as "denomination information") indicating the identified denomination to the serial number recognition unit 24. The denomination identification unit 22 identifies the denomination on the basis of, for example, a length and a width of the paper currency BL, a pattern on a face of the paper currency, or the like.

The storage unit 23 stores therein a learning model that is generated by using a Convolutional Neural Network (CNN).

The serial number recognition unit 24 recognizes the serial number of the paper currency BL on the basis of the paper currency image BLP, which is input from the paper currency imaging unit 21, by using the denomination information that is input from the denomination identification unit 22 and the learning model that is stored in the storage unit 23, and outputs a recognition result.

Process and Operation Performed by Serial Number Recognition Unit

Figure 5:
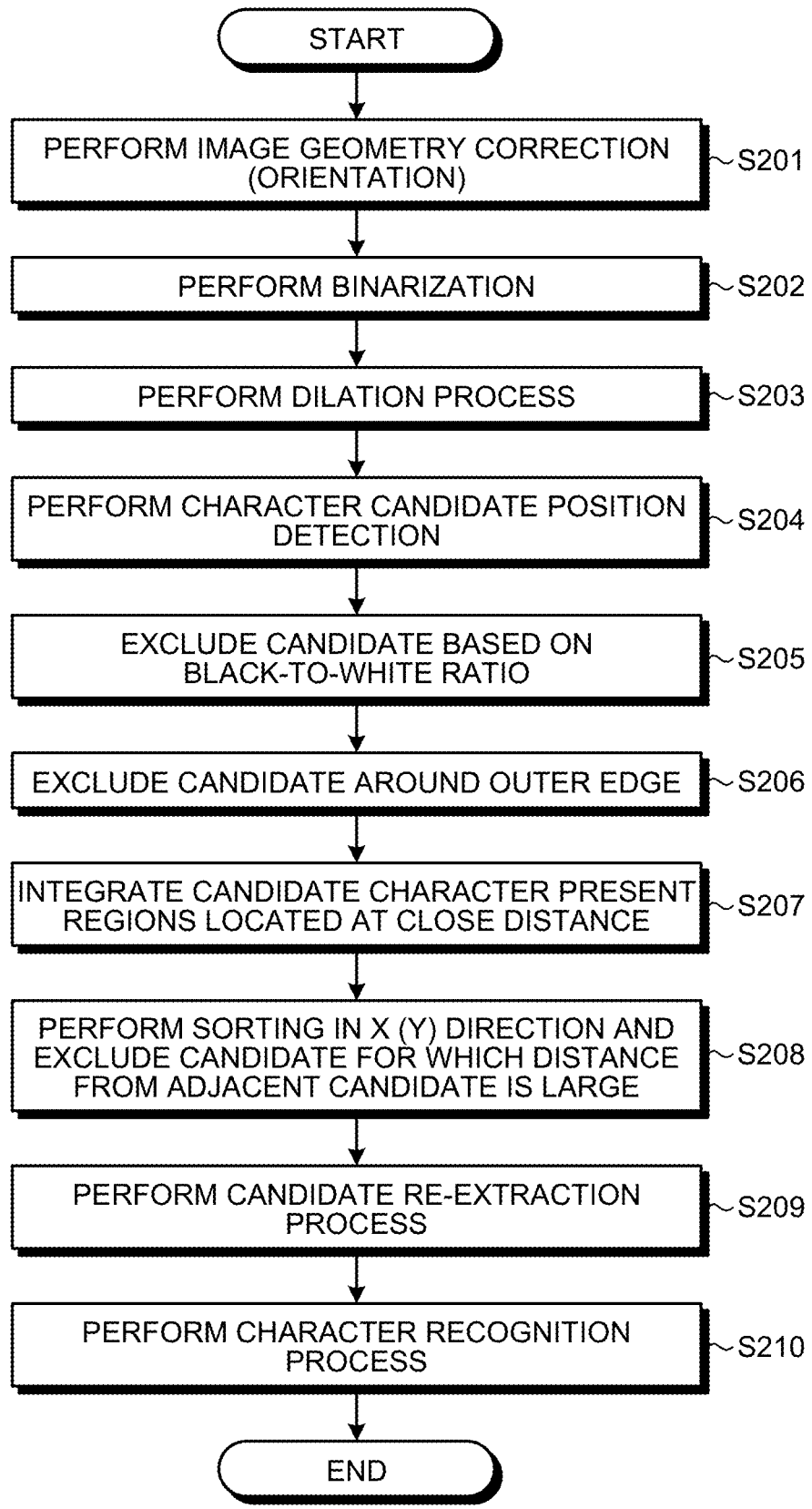
FIG. 5 is a flowchart for explaining an example of a process performed by a serial number recognition unit according to the embodiment.

FIG. 5 is a flowchart for explaining an example of a process performed by the serial number recognition unit 24 according to the embodiment, and FIG. 6 to FIG. 18 are diagrams for explaining an example of operation performed by the serial number recognition unit 24 according to the embodiment. Meanwhile, it is assumed that, before start of the process illustrated in FIG. 5, the serial number recognition unit 24 extracts an image (hereinafter, may be referred to as a "serial number present region image") SNP1 of a region (hereinafter, may be referred to as a "serial number present region") in which the serial number is present or a serial number present region image SNP2 in the paper currency image BLP from the paper currency image BLP as illustrated in FIG. 6.

The serial number is represented by numbers and alphabets that are arranged in a lateral direction, and therefore, the serial number present region is a region that has a horizontally long rectangular shape. Further, for example, in the case of Bank of Japan Notes, the serial number is printed in a lower right portion in the paper currency BL when the paper currency BL is viewed in a landscape orientation. Therefore, if the paper currency BL is the Bank of Japan Note, the serial number recognition unit 24 extracts the serial number present region image SNP1 that has a horizontally long rectangular shape from the lower right portion of the paper currency image BLP as illustrated in FIG. 6. For example, if an upper left corner of the paper currency image BLP is adopted as an origin 0 (zero), if the horizontal axis is adopted as the X axis, and if a vertical axis is adopted as the Y axis, an upper left corner of the serial number present region is represented by a coordinate (x1, y1) and a lower right corner of the serial number present region is represented by a coordinate (x2, y2). Therefore, if the paper currency BL is the Bank of Japan Note, the serial number recognition unit 24 extracts an image of a rectangular region that is identified from the coordinate (x1, y1) and the coordinate (x2, y2) as the serial number present region image SNP1 from the paper currency image BLP.

Figure 6:
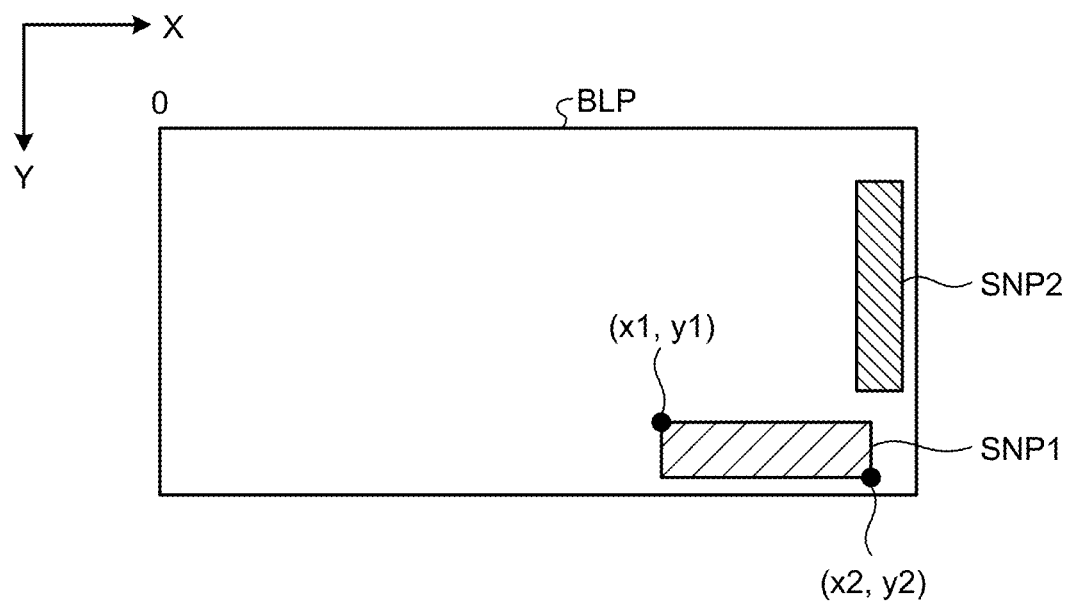
FIG. 6 is a diagram for explaining an example of operation performed by the serial number recognition unit according to the embodiment.

Furthermore, in a paper currency of a specific foreign country, as illustrated in FIG. 6, the serial number may be printed in a lateral direction along a right side of the paper currency BL when the paper currency BL is viewed in the landscape orientation. Therefore, if the paper currency BL is a paper currency of a specific foreign country, as illustrated in FIG. 6, the serial number recognition unit 24 extracts the serial number present region image SNP2 that has a vertically long rectangular shape from a right side portion of the paper currency image BLP.

In the following, the serial number present region images SNP1 and SNP2 may be collectively referred to as a "serial number present region image SNP".

Figure 7:
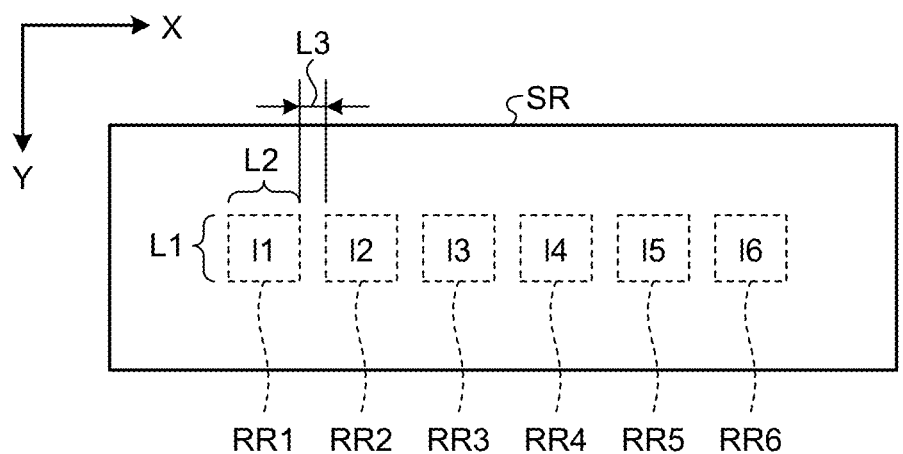
FIG. 7 is a diagram for explaining an example of the operation performed by the serial number recognition unit according to the embodiment.

Here, as illustrated in FIG. 7, if the serial number of the paper currency BL is formed of six characters 11 to 16, the characters 11 to 16 are respectively arranged in regions PR1 to PR6 (hereinafter, may be referred to as "prescribed size regions") each having a prescribed size in which a vertical length is denoted by L1 and a horizontal length is denoted by L2 in the serial number present region SR. All of the prescribed size regions RR1 to RR6 have the same size, and each of the prescribed size regions RR1 to RR6 is arranged at an equal interval L3.

As illustrated in FIG. 5, at Step S201, the serial number recognition unit 24 performs image geometry correction. Specifically, if the serial number present region image is an image that has a vertically long rectangular shape like the serial number present region image SNP2 in FIG. 6, the serial number recognition unit 24 rotates the serial number present region image by 90 degrees to correct orientation of the serial number present region image. Through the correction, the serial number present region image SNP2 that has a vertically long rectangular shape is corrected to the serial number present region image that has a horizontally long rectangular shape like the serial number present region image SNP1.

Subsequently, at Step S202, the serial number recognition unit 24 performs a binarization process on the serial number present region image SNP.

Figure 8:
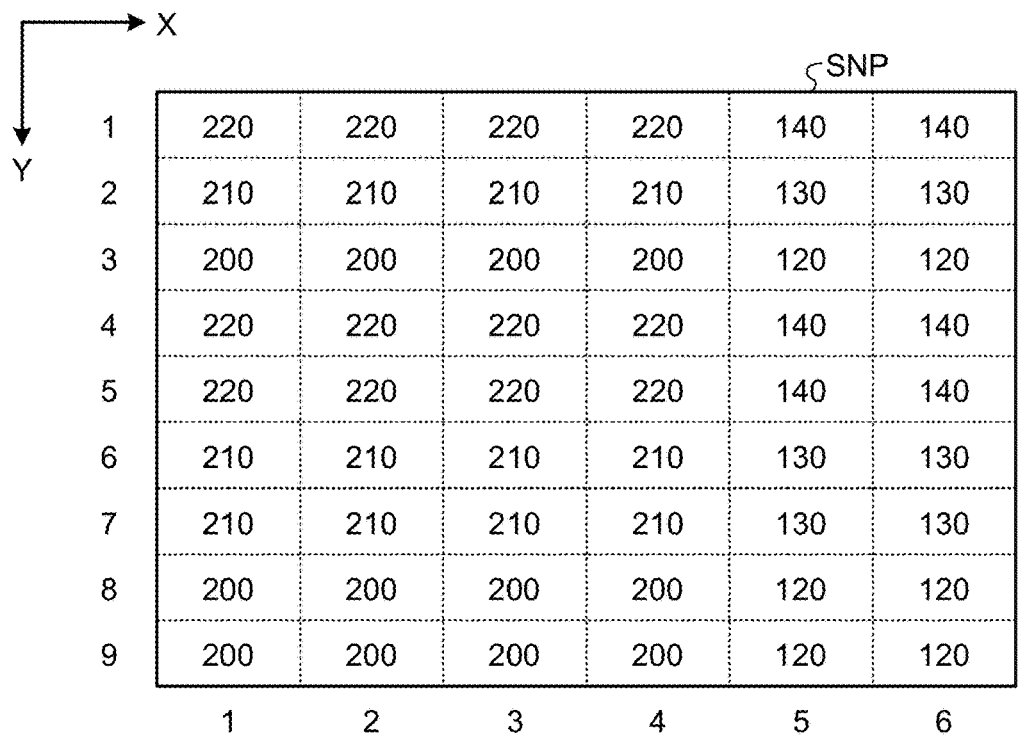
FIG. 8 is a diagram for explaining an example of the operation performed by the serial number recognition unit according to the embodiment.

For example, as illustrated in FIG. 8, if it is assumed that the serial number present region image SNP is formed of 54 pixels, i.e., a pixel (x, y)=a pixel (1, 1) to a pixel (6, 9), and each of the pixels has a grayscale value with a value as illustrated in FIG. 8, the serial number recognition unit 24 performs the binarization process as in a first example of the binarization process or a second example of the binarization process as described below, for example. A type of the binarization process is specified by a binarization type BTYPE.

Figure 9:
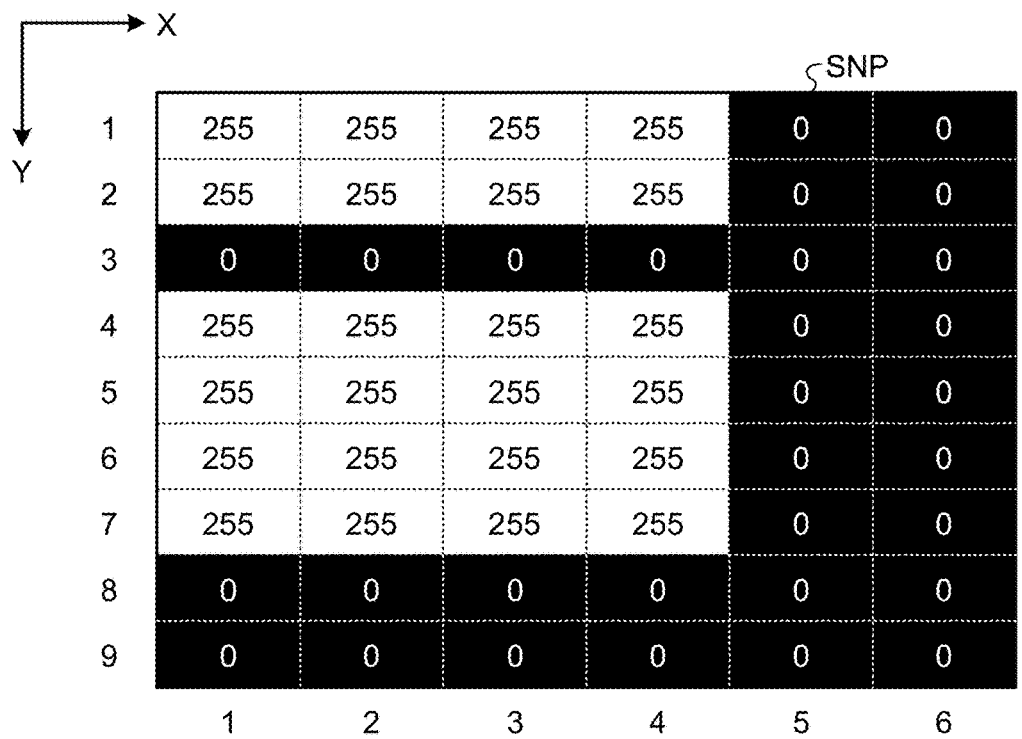
FIG. 9 is a diagram for explaining an example of the operation performed by the serial number recognition unit according to the embodiment.

In the first example of the binarization process, the serial number recognition unit 24 binarizes the serial number present region image SNP by using a fixed binarization threshold TH1. Therefore, for example, if the binarization threshold TH1 is "210", as illustrated in FIG. 9, the serial number recognition unit 24 binarizes the serial number present region by changing the grayscale values of the pixels having the grayscale values equal to or larger than 210 in FIG. 8 to "255" and changing the grayscale values of the pixels having the grayscale values smaller than 210 in FIG. 8 to "0".

Furthermore, the serial number recognition unit 24 may set the binarization threshold TH1 to a certain value corresponding to the denomination that is indicated by the denomination information output from the denomination identification unit 22.

Figure 10:
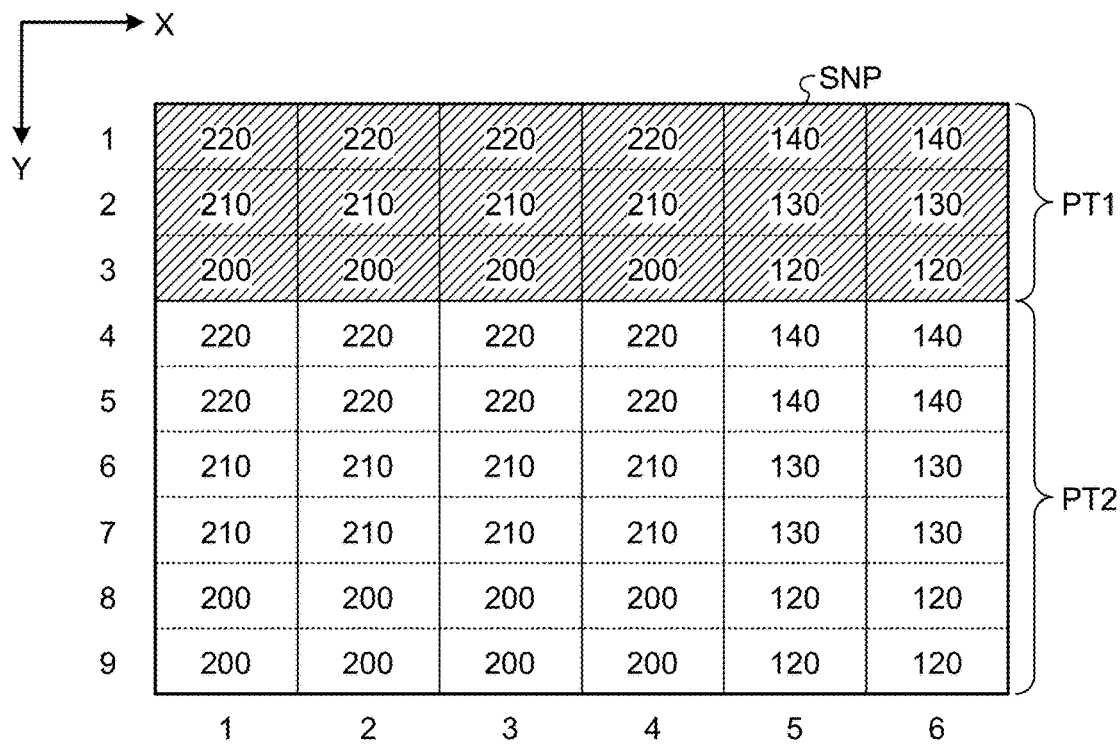
FIG. 10 is a diagram for explaining an example of the operation performed by the serial number recognition unit according to the embodiment.
Figure 11:
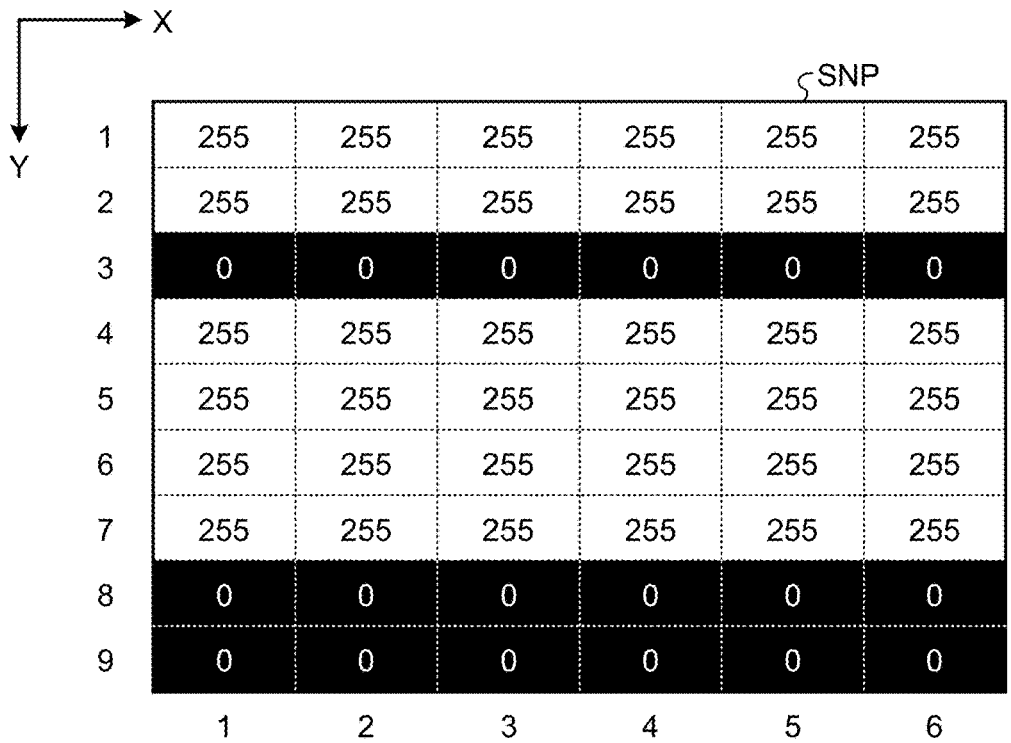
FIG. 11 is a diagram for explaining an example of the operation performed by the serial number recognition unit according to the embodiment.
Figure 12:
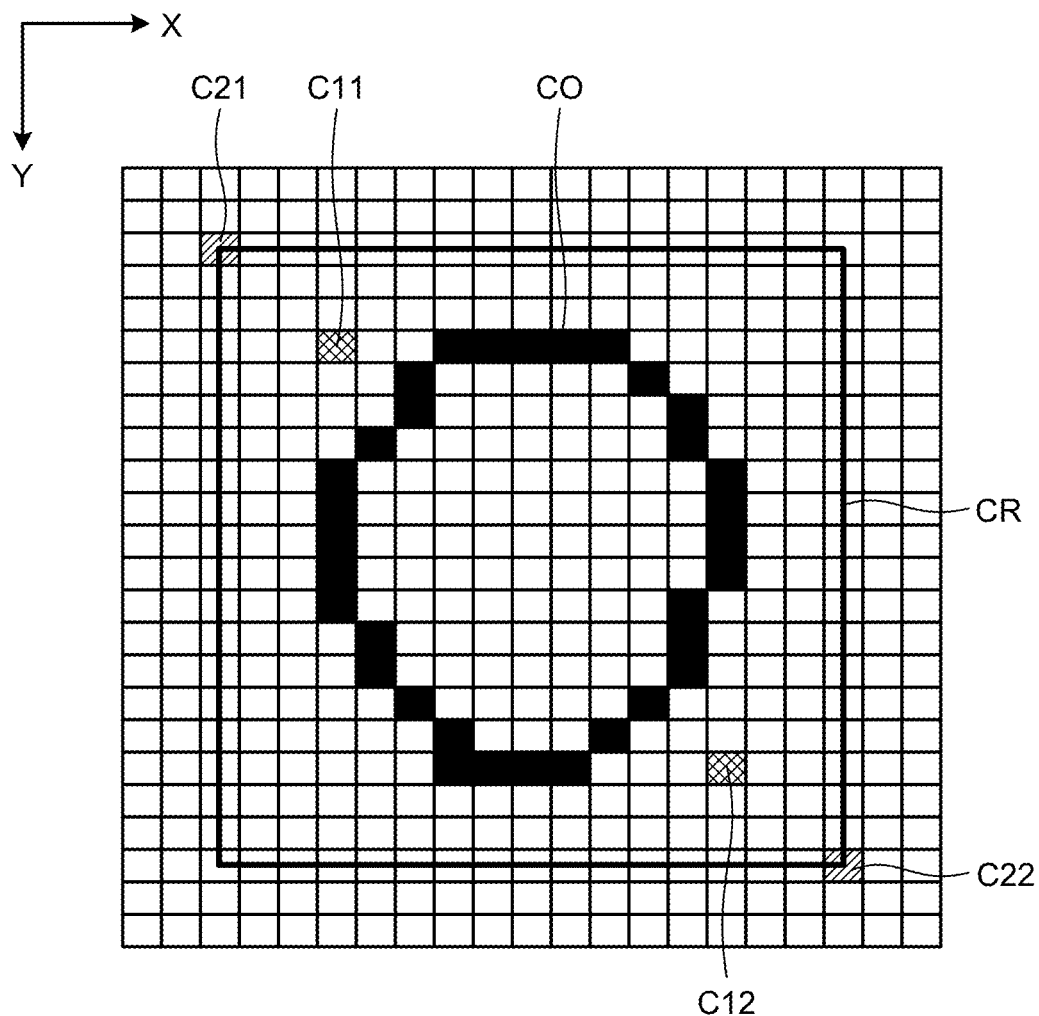
FIG. 12 is a diagram for explaining an example of the operation performed by the serial number recognition unit according to the embodiment.

In the second example of the binarization process, as illustrated in FIG. 10, the serial number recognition unit 24 first sets a first portion PT1 and a second portion PT2 for the plurality of pixels included in the serial number present region image SNP. Subsequently, the serial number recognition unit 24 calculates an average value of the grayscale values in the first portion PT1 for each of columns among the 54 pixels, i.e., the pixel (1, 1) to the pixel (6, 9), and sets the calculated average value as a binarization threshold TH2 for each of the columns for which the average value is calculated. Therefore, for example, the binarization threshold TH2 for each of the first column to the fourth column is calculated such that (220+210+200)/3=210, and the binarization threshold TH2 for each of the fifth column and the sixth column is calculated such that (140+130+120)/3=130. In this manner, the serial number recognition unit 24 calculates the binarization threshold TH2 for each of the columns by using the first portion PT1 for the 54 pixels, i.e., the pixel (1, 1) to the pixel (6, 9). Consequently, as illustrated in FIG. 11, with respect to the first column to the fourth column, the serial number recognition unit 24 binarizes the serial number present region by changing the grayscale values of the pixels having the grayscale values equal to or larger than 210 in FIG. 10 to "255" and changing the grayscale values of the pixels having the grayscale values smaller than 210 in FIG. 10 to "0" because the binarization threshold TH2 is set to "210". Further, as illustrated in FIG. 11, with respect to the fifth row and the sixth row, the serial number recognition unit 24 binarizes the serial number present region by changing the grayscale values of the pixels having the grayscale values equal to or larger than 130 in FIG. 10 to "255" and changing the grayscale values of the pixels having the grayscale values smaller than 130 in FIG. 10 to "0" because the binarization threshold TH2 is set to "130".

Referring back to FIG. 5, at subsequent Step S203 and Step S204, the serial number recognition unit 24 detects, in the serial number present region image SNP, candidates (hereinafter, may be referred to as "candidate character present regions") for a region CR (hereinafter, may be referred to as a "character present region") in which an image (hereinafter, may be referred to as a "character image") of a character that forms the serial number of the paper currency BL is present. The serial number recognition unit 24 detects the candidate character present regions by using, for example, a "boundary tracking method" that is a general method for tracking pixels of a shape that is adjacent to a background in a binary image.

Specifically, at Step S203, the serial number recognition unit 24 performs a dilation (dilate) process. More specifically, the serial number recognition unit 24 extends an outline CO (hereinafter, may be referred to as an "image outline") of an image illustrated in FIG. 12 to an outer side of a prescribed pixel in accordance with the outline in the binarized serial number present region image SNP. Here, the prescribed pixel is designated by a dilation amount DPXL. Further, the serial number recognition unit 24 adopts the boundary tracking method, and detects the image outline CO included in the binarized serial number present region image SNP. Subsequently, the serial number recognition unit 24 detects, for the plurality of pixels (x, y) that form the image outline CO, a minimum value xmin of the X coordinates, a minimum value ymin of the Y coordinates, a maximum value xmax of the X coordinates, and a maximum value ymax of the Y coordinates. Then, the serial number recognition unit 24 identifies, in the serial number present region image SNP, a coordinate C11=(xmin, ymin) with the minimum value xmin and the minimum value ymin and a coordinate C12=(xmax, ymax) with the maximum value xmax and the maximum value ymax. Subsequently, the serial number recognition unit 24 identifies, in the serial number present region image SNP, a coordinate C21 that is located at a predetermined distance (for example, a distance of three pixels in the negative X direction and three pixels in the negative Y direction) from the coordinate C11 and a coordinate C22 that is located at a predetermined distance (for example, a distance of three pixels in the positive X direction and three pixels in the positive Y direction) from the coordinate C12.

Further, at Step S204, the serial number recognition unit 24 performs character candidate position detection. Specifically, a rectangular region with an upper left corner at the coordinate C21 and a lower right corner at the coordinate C22 is detected as a candidate for the character present region CR. The serial number recognition unit 24 performs the dilation process and the character candidate position detection a plurality of number of times, and detects the plurality of candidate character present regions in the serial number present region image SNP.

At subsequent Step S205 to Step S209, the serial number recognition unit 24 performs a process of narrowing down a character present region from the plurality of candidate character present regions.

Figure 13:
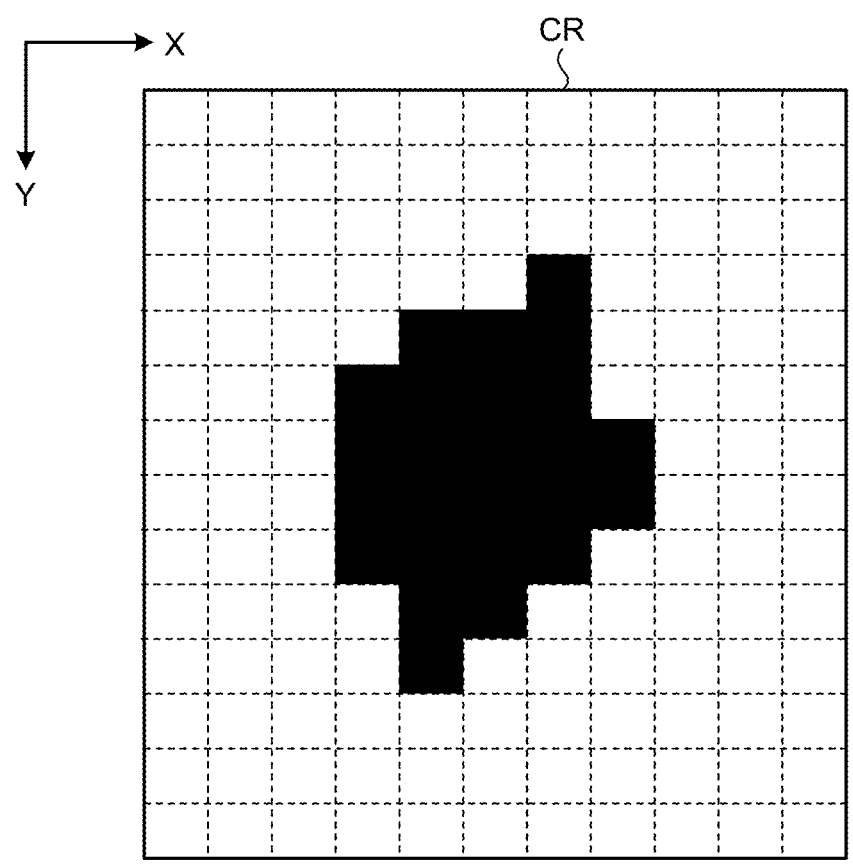
FIG. 13 is a diagram for explaining an example of the operation performed by the serial number recognition unit according to the embodiment.

Specifically, at Step S205, the serial number recognition unit 24 excludes a candidate based on a black-to-white ratio. More specifically, as illustrated in FIG. 13, the serial number recognition unit 24 excludes, from the plurality of candidate character present regions, a candidate for which a ratio of black pixels (in other words, pixels with the grayscale values of "0" due to the binarization) to white pixels (in other words, pixels with the grayscale values of "255" due to the binarization) in the character present region CR is equal to or larger than a black-to-white ratio threshold THR, and identifies the character present regions in the serial number present region image SNP. For example, the black-to-white ratio threshold THR is set to 20%.

Figure 14:
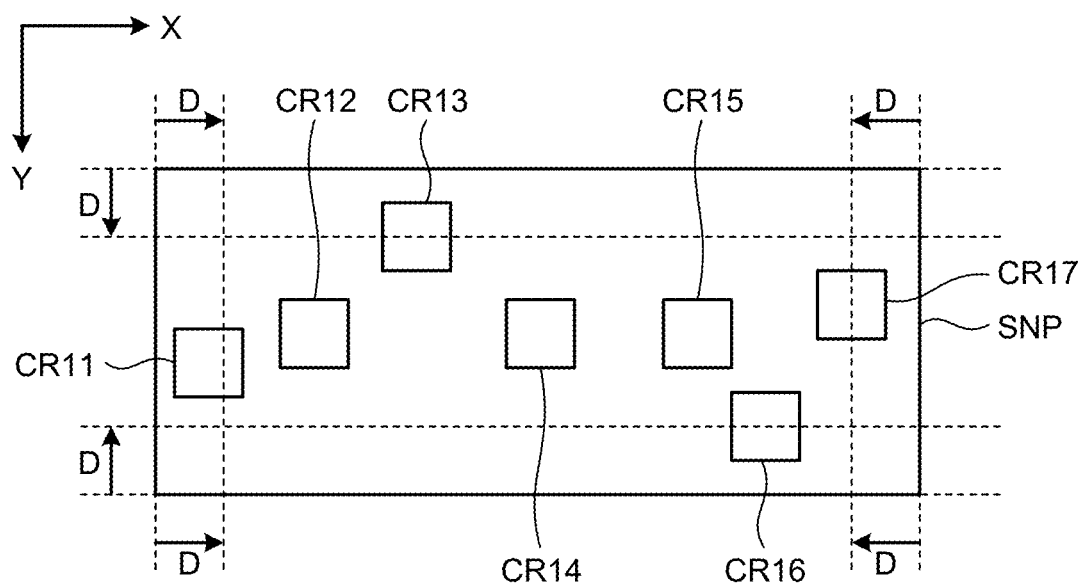
FIG. 14 is a diagram for explaining an example of the operation performed by the serial number recognition unit according to the embodiment.

Further, at Step S206, the serial number recognition unit 24 excludes a candidate in the vicinity of an outer edge. Specifically, as illustrated in FIG. 14, the serial number recognition unit 24 excludes, from the plurality of candidate character present regions, a candidate that is located within a predetermined distance D from the outer edge of the serial number present region image SNP, and identifies the character present regions in the serial number present region image SNP. Which of the outer edges located at the top, at the bottom, at the left, and at the right is adopted as the outer edge with respect to which a candidate located within the predetermined distance D is excluded is determined by outer edge designation UDLR. For example, in the example illustrated in FIG. 14, among a plurality of candidates CR11 to CR17 for the character present regions, the candidate CR11 is located within the predetermined distance D from a left side of the serial number present region image SNP, the candidate CR13 is located within the predetermined distance D from a top side of the serial number present region image SNP, the candidate CR16 is located within the predetermined distance D from a bottom side of the serial number present region image SNP, and the candidate CR17 is located within the predetermined distance D from a right side of the serial number present region image SNP. Therefore, in the example illustrated in FIG. 14, the candidate CR11 is excluded if the left is designated by UDLR, the candidate CR13 is excluded if the top is designated by UDLR, the candidate CR16 is excluded if the bottom is designated by UDLR, and the candidate CR17 is excluded if the right is designated by UDLR from among the plurality of candidates CR11 to CR17 for the character present regions.

Furthermore, at Step S207, the serial number recognition unit 24 performs a process of integrating the candidate character present regions CR located at a close distance.

Figure 15:
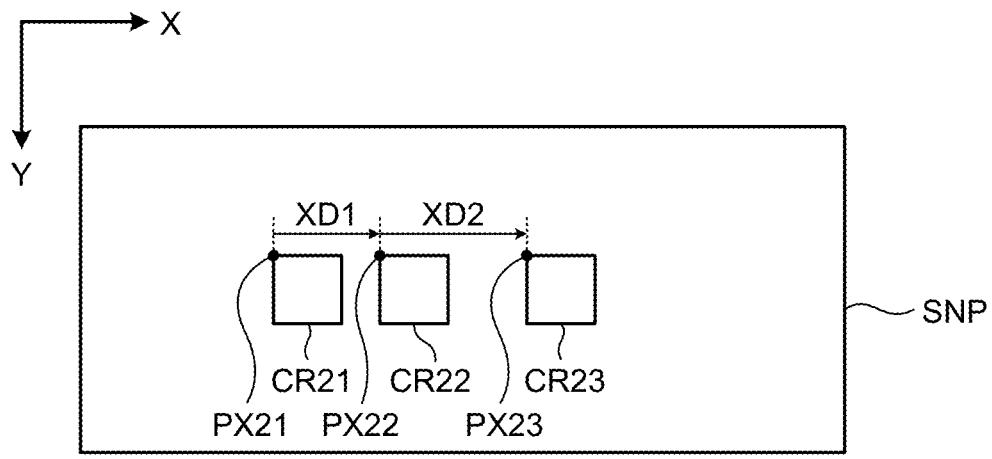
FIG. 15 is a diagram for explaining an example of the operation performed by the serial number recognition unit according to the embodiment.

Moreover, at Step S208, the serial number recognition unit 24 performs a process of performing sorting in the X direction and excluding a candidate for which a distance from an adjacent candidate is large, and performs a process of performing sorting in the Y direction and excluding a candidate for which a distance from an adjacent candidate is large. Specifically, as illustrated in FIG. 15, the serial number recognition unit 24 acquires X coordinates PX21, PX22, and PX23 of upper left corners of a plurality of candidate character present regions CR21, CR22, and CR23, and sorts the X coordinates PX21, PX22, and PX23 in ascending order. Subsequently, the serial number recognition unit 24 calculates a distance XD1 of the X coordinate PX22 with respect to the X coordinate PX21 as a distance of the candidate CR22 with respect to the candidate CR21 and calculates a distance XD2 of the X coordinate PX23 with respect to the X coordinate PX22 as a distance of the candidate CR23 with respect to the candidate CR22 in the sort order. Further, the serial number recognition unit 24 excludes the candidate for which the calculated distance is equal to or larger than an X-distance threshold THX, and identifies the character present regions in the serial number present region image SNP. For example, in FIG. 15, if the distance XD1 is smaller than the X-distance threshold THX and the distance XD2 is equal to or larger than the X-distance threshold THX, the candidate CR23 is excluded from the plurality of candidates CR21, CR22, and CR23 for the character present region, and the character present regions CR21 and CR22 are identified as the character present regions in the serial number present region image SNP.

Figure 16:
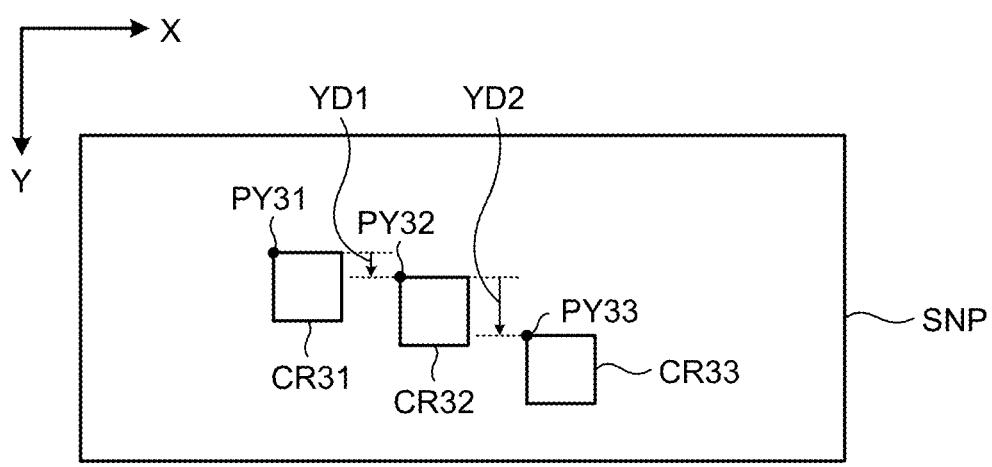
FIG. 16 is a diagram for explaining an example of the operation performed by the serial number recognition unit according to the embodiment.

Similarly, as illustrated in FIG. 16, the serial number recognition unit 24 acquires Y coordinates PY31, PY32, and PY33 of the upper left corners of the plurality of candidate character present regions CR21, CR22, and CR23, and sorts the Y coordinates PY31, PY32, and PY33 in ascending order. Subsequently, the serial number recognition unit 24 calculates a distance YD1 of the Y coordinate PY32 with respect to the Y coordinate PY31 as a distance of a candidate CR32 with respect to a candidate CR31 and calculates a distance YD2 of the Y coordinate PY33 with respect to the Y coordinate PY32 as a distance of a candidate CR33 with respect to the candidate CR32 in the sort order. Further, the serial number recognition unit 24 excludes the candidate for which the calculated distance is equal to or larger than a Y-distance threshold THY, and identifies the character present regions in the serial number present region image SNP. For example, in FIG. 16, if the distance YD1 is smaller than the Y-distance threshold THY and the distance YD2 is equal to or larger than the Y-distance threshold THY, the candidate CR33 is excluded from the plurality of candidates CR31, CR32, and CR33 for the character present region, and the character present regions CR31 and CR32 are identified as the character present regions for the serial number present region image SNP.

Figure 17:
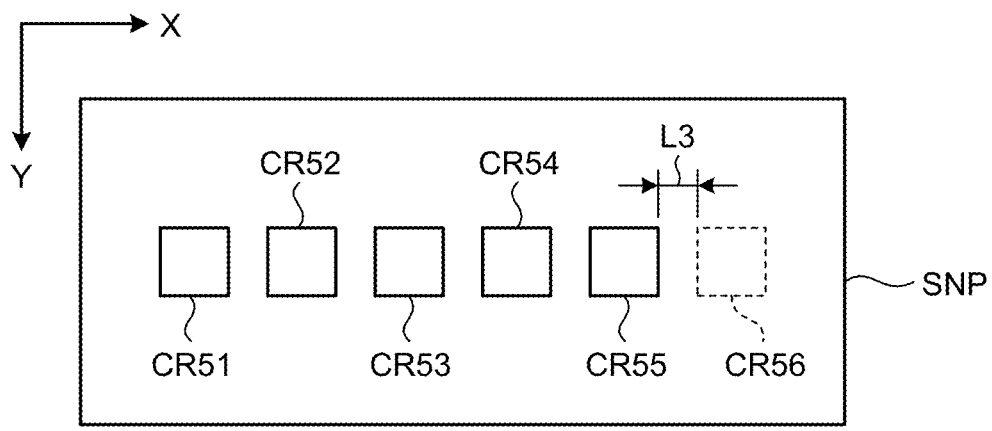
FIG. 17 is a diagram for explaining an example of the operation performed by the serial number recognition unit according to the embodiment.

Furthermore, at Step S209, the serial number recognition unit 24 performs a candidate re-extraction process. Specifically, as illustrated in FIG. 17, if the number of the identified character present regions is smaller than the number N of the characters that form the serial number of the paper currency BL, the serial number recognition unit 24 adds a new character present region on the basis of the number N of the characters that form the serial number of the paper currency BL, and identifies the character present regions in the serial number present region image SNP. For example, when the serial number of the paper currency BL is formed of the six characters as illustrated in FIG. 7, and if the five character present regions CR51 to CR55 are identified as the character present regions as illustrated in FIG. 17, the number of the character present regions is smaller than the number of the characters included in the serial number of the paper currency BL. Moreover, in the example illustrated in FIG. 17, a difference between the number of the character present regions (five) and the number of the characters (six) included in the serial number of the paper currency BL is one. Therefore, in the example illustrated in FIG. 17, the serial number recognition unit 24 adds a new single character present region CR56 to the character present regions CR51 to CR55, and identifies the character present regions in the serial number present region image SNP. For example, the serial number recognition unit 24 adds the character present region CR56 at a position separated by the interval L3 (FIG. 7) from the character present region CR55 that is located on the rightmost side among the character present regions CR51 to CR55.

Referring back to FIG. 5, at subsequent Step S210, the serial number recognition unit 24 performs a character recognition process. Specifically, the serial number recognition unit 24 extracts an image (hereinafter, may be referred to as a "character present region image") of each of the character present regions from the paper currency image BLP, and recognizes a character included in each of the extracted character present region images on the basis of the learning model that is stored in the storage unit 23. Meanwhile, the serial number recognition unit 24 may perform the character recognition on the basis of the Euclidean distance with respect to dictionary data, instead of the learning model.

Hardware Configuration of Paper Currency Inspection Apparatus

The paper currency inspection apparatus 14 may be implemented by a hardware configuration as described below. The paper currency imaging unit 21 is implemented by, for example, a camera. The denomination identification unit 22 is implemented by, for example, various sensors, such as an optical sensor or a magnetic sensor. The serial number recognition unit 24 is implemented by, for example, a processor. The storage unit 23 is implemented by, for example, a memory. Examples of the processor include a central processing unit (CPU). Examples of the memory include a Random Access Memory (RAM), such as Synchronous Dynamic Random Access Memory (SDRAM), and a flash memory.

Furthermore, the serial number recognition unit 24 is implemented by causing a processor to execute a serial number recognition program. For example, the serial number recognition program is stored in a memory included in the paper currency handling apparatus 1, is read from the memory by a processor included in the paper currency handling apparatus 1, and is executed by the processor.

Configuration of Paper Currency Handling System

Figure 18:
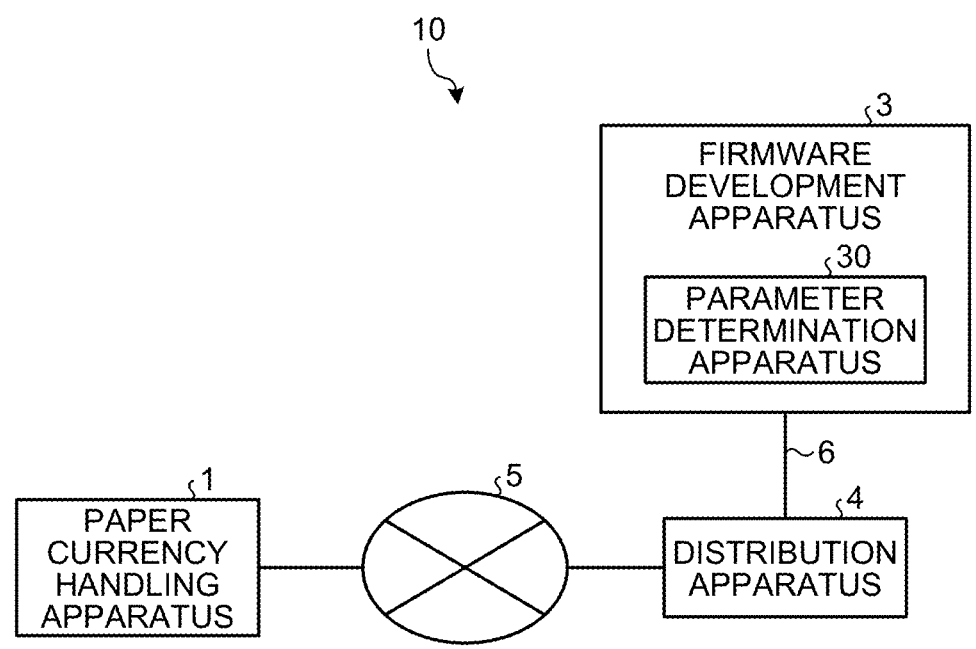
FIG. 18 is a diagram illustrating a configuration example of the paper currency handling system according to the embodiment.

FIG. 18 is a diagram illustrating a configuration example of the paper currency handling system according to the embodiment. As illustrated in FIG. 18, a paper currency handling system 10 according to the embodiment includes the paper currency handling apparatus 1, a firmware development apparatus 3, and a distribution apparatus 4. The paper currency handling apparatus 1 and the distribution apparatus 4 are connected to each other by a network 5. Meanwhile, in FIG. 18, the single paper currency handling apparatus 1 is illustrated for convenience of explanation, but the plurality of paper currency handling apparatuses 1 may be connected to the network 5. The firmware development apparatus 3 and the distribution apparatus 4 are connected to each other by a network 6. Meanwhile, the firmware development apparatus 3 and the distribution apparatus 4 may be connected to each other by the network 5.

The firmware development apparatus 3 is used to develop a control program for controlling the paper currency handling apparatus 1. The control program includes the serial number recognition program. The distribution apparatus 4 distributes a load module of the control program that is developed by the firmware development apparatus 3 to the paper currency handling apparatus 1.

The firmware development apparatus 3 includes a parameter determination apparatus 30. The serial number recognition program is parameterized, and the parameter determination apparatus 30 determines a value of a parameter of the serial number recognition program. The parameter determination apparatus 30 optimizes the parameter by using the Genetic Algorithm (GA). The firmware development apparatus 3 generates the load module from the parameter value that is determined by the parameter determination apparatus 30 and an object module of the control program.

Meanwhile, the case is illustrated in FIG. 18 in which the firmware development apparatus 3 includes the parameter determination apparatus 30, but the firmware development apparatus 3 and the parameter determination apparatus 30 may be provided as separate apparatuses.

Parameters

Figures 19, 20:
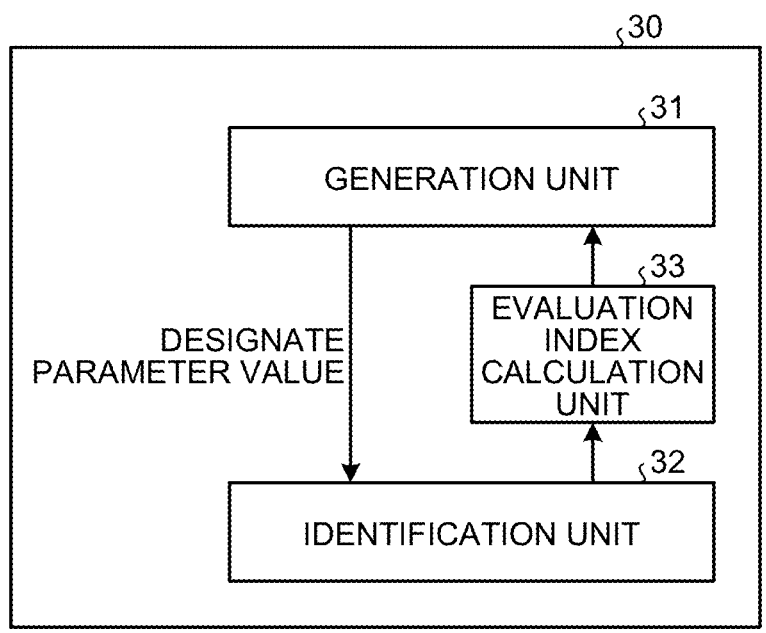
FIG. 19 is a diagram illustrating an example of a parameter set for which values are determined by a parameter determination apparatus.
FIG. 20 is a diagram illustrating a configuration example of the parameter determination apparatus.

FIG. 19 is a diagram illustrating an example of parameters for which values are determined by the parameter determination apparatus 30. As illustrated in FIG. 19, the parameters include the binarization threshold TH1, the binarization type BTYPE, the dilation amount DPXL, the black-to-white ratio threshold THR, the outer edge designation UDLR for excluding candidates at the edge of the serial number present region image, the X-distance threshold THX, and the Y-distance threshold THY.

Configuration of the Parameter Determination Apparatus

FIG. 20 is a diagram illustrating a configuration example of the parameter determination apparatus 30. As illustrated in FIG. 20, the parameter determination apparatus 30 includes a generation unit 31, an identification unit 32, and an evaluation index calculation unit 33.

The generation unit 31 generates a parameter value on the basis of the GA. The generation unit 31 uses the Real-Coded GA (RCGA). The generation unit 31 adopts a set of parameter values as a single individual. The generation unit 31 generates 30 individuals for a single generation, for example. The number of individuals generated for a single generation is changeable.

FIG. 21 illustrates an example of individuals. In FIG. 21, the number of parameters is set to eight. XA0 to XE0 are values of a parameter X0, XA1 to XE1 are values of a parameter X1, . . . , and XA7 to XE7 are values of a parameter X7.

The identification unit 32 identifies the character present regions by using the individuals generated by the generation unit 31. The identification unit 32 identifies the character present regions for each of the individuals. The identification unit 32 identifies the character present regions by simulation.

Figure 22:
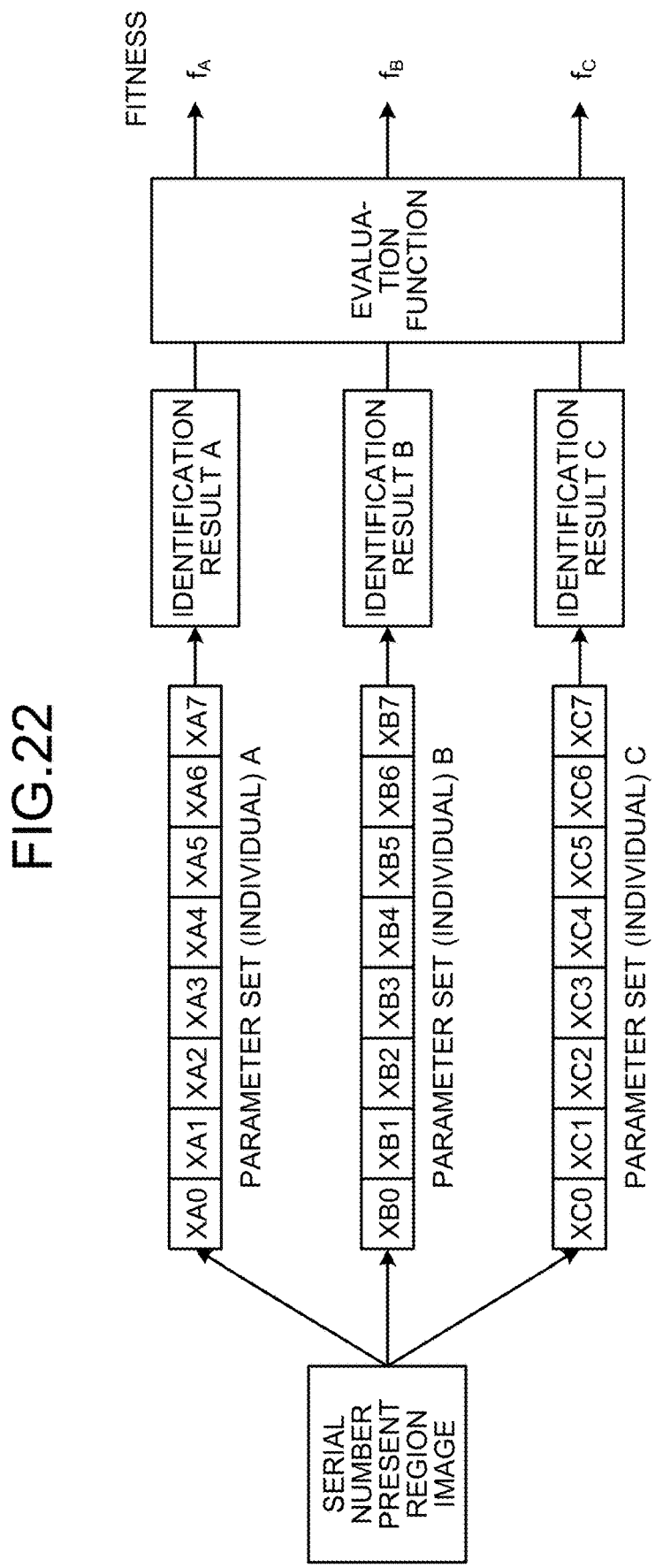
FIG. 22 is a diagram for explaining fitness.

The evaluation index calculation unit 33 evaluates the individuals by calculating fitness of the character present regions that are identified by the identification unit 32. FIG. 22 is a diagram for explaining the fitness. As illustrated in FIG. 22, the evaluation index calculation unit 33 evaluates an identification result obtained by the identification unit 32 by using an evaluation function and calculates the fitness, for each of the parameter sets (individuals). Here, the parameter set is a set of values of parameters. For example, the evaluation index calculation unit 33 evaluates, with use of the evaluation function, an identification result A of character present regions obtained by using the parameter set A, and calculates fitness $f_A$.

The evaluation function is a function based on an evaluation function $f_{num}$ related to the number of characters, an evaluation function $f_{dis}$ related to character spacing, and an evaluation function $f_{str\_w}$ related to a character string width. $f_{num}$, $f_{dis}$ and $f_{str\_w}$ are, for example, functions as described below.

$$f_{num} = 1 - \left| \frac{n - N}{N} \right| \quad \text{[Expression 1]}$$

-continued $$f_{dis} = \frac{1}{n-1}\sum_{i}^{n-1}\exp\left(-\frac{(d_i - D)^2}{2\sigma^2}\right)$$

$$f_{str\_w} = \exp\left(-\frac{(w - W)^2}{2\sigma^2}\right)$$

Figure 23:
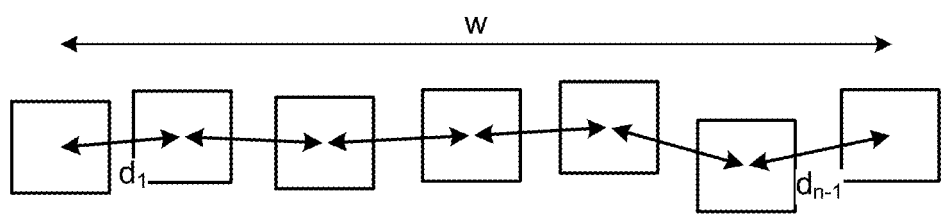
FIG. 23 is a diagram for explaining d and w.

Here, n is the number of identified characters, $d_i$ (I=1 to n−1) is an identified character spacing, and w is an identified character string width. FIG. 23 is a diagram for explaining d and w. As illustrated in FIG. 23, $d_i$ is a distance between centers of the adjacent character present regions, and w is a distance between a center of the character present region at the left end and a center of the character present region at a right end. A unit of each of $d_i$ and w is a pixel.

Figure 24:
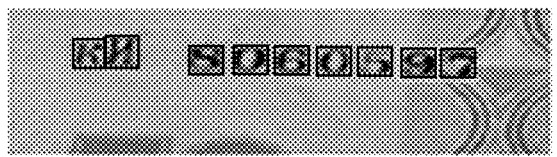
FIG. 24 is a diagram illustrating examples of N, D, and W.
Figure 24:
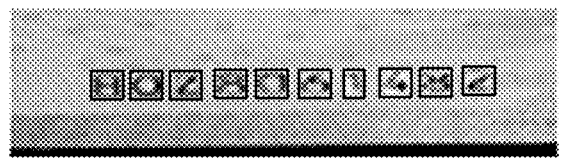

N, D, and W are the number of characters, the character spacing, and the character string width that are set as correct answers. A unit of each of D and W is a pixel. FIG. 24 is a diagram illustrating examples of N, D, and W. As illustrated in FIG. 24, for example, N=7, D=21, and W=128.

Figure 25:
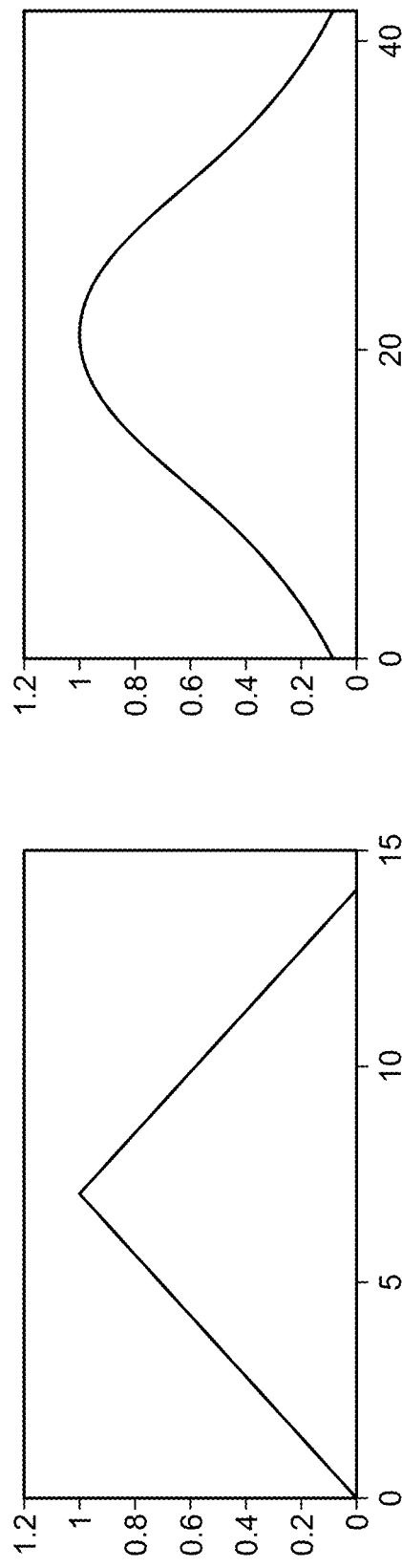
FIG. 25 is a diagram illustrating a graph of $f_{num}$ and a graph of a normal distribution of an average value $\mu$ and a dispersion $\sigma^2$ used for $f_{dis}$ and $f_{str\_w}$.

$\sigma^2$ represents dispersion of a normal distribution. FIG. 25 illustrates a graph of $f_{num}$, and a graph of a normal distribution of an average value μ and the dispersion $\sigma^2$ used for $f_{dis}$ and $f_{str\_w}$.

Fitness $f_{total}$ is, for example, $f_{total}=w_{num}\times f_{num}+w_{dis}\times f_{dis}+w_{str\_w}\times f_{str\_w}$. Here, $w_{num}$, $w_{dis}$, and $w_{str\_w}$ are weights.

The generation unit 31 selects a parent based on the fitness $f_{total}$, and generates a child population by using crossover or mutation. The parameter determination apparatus 30 repeats the processes performed by the generation unit 31, the identification unit 32, and the evaluation index calculation unit 33 until a predetermined termination condition is met. The termination condition is met when the number of generations reaches a predetermined value (for example, 30), for example.

Figure 26:
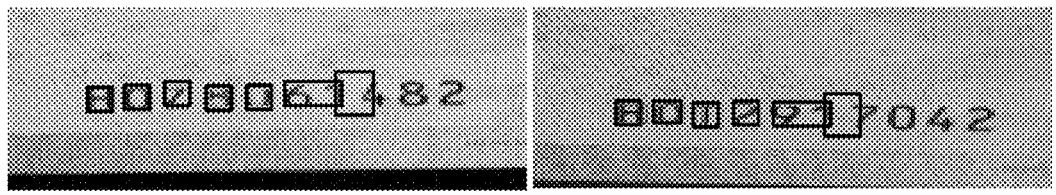
FIG. 26 is a diagram illustrating an example of optimization of a parameter set by GA.
Figure 26:
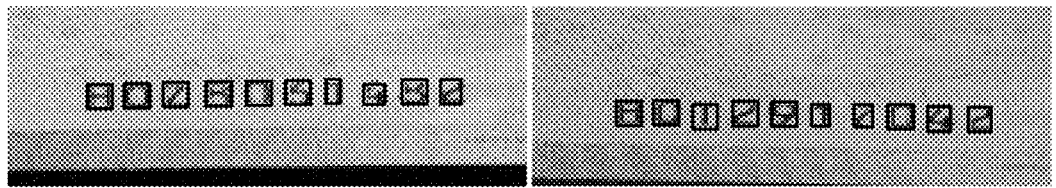

FIG. 26 is a diagram illustrating an example of optimization of the parameter set by the GA. In FIG. 26, rectangular frames indicate identification results of the character present regions. FIG. 26(a) illustrates identification results using a parameter set of an early generation, and FIG. 26(b) illustrates identification results using a parameter set of a last generation. As illustrated in FIG. 26, the parameter set is optimized by the GA, and the character present regions are correctly identified.

Flow of Process Performed by Parameter Determination Apparatus

Figure 27:
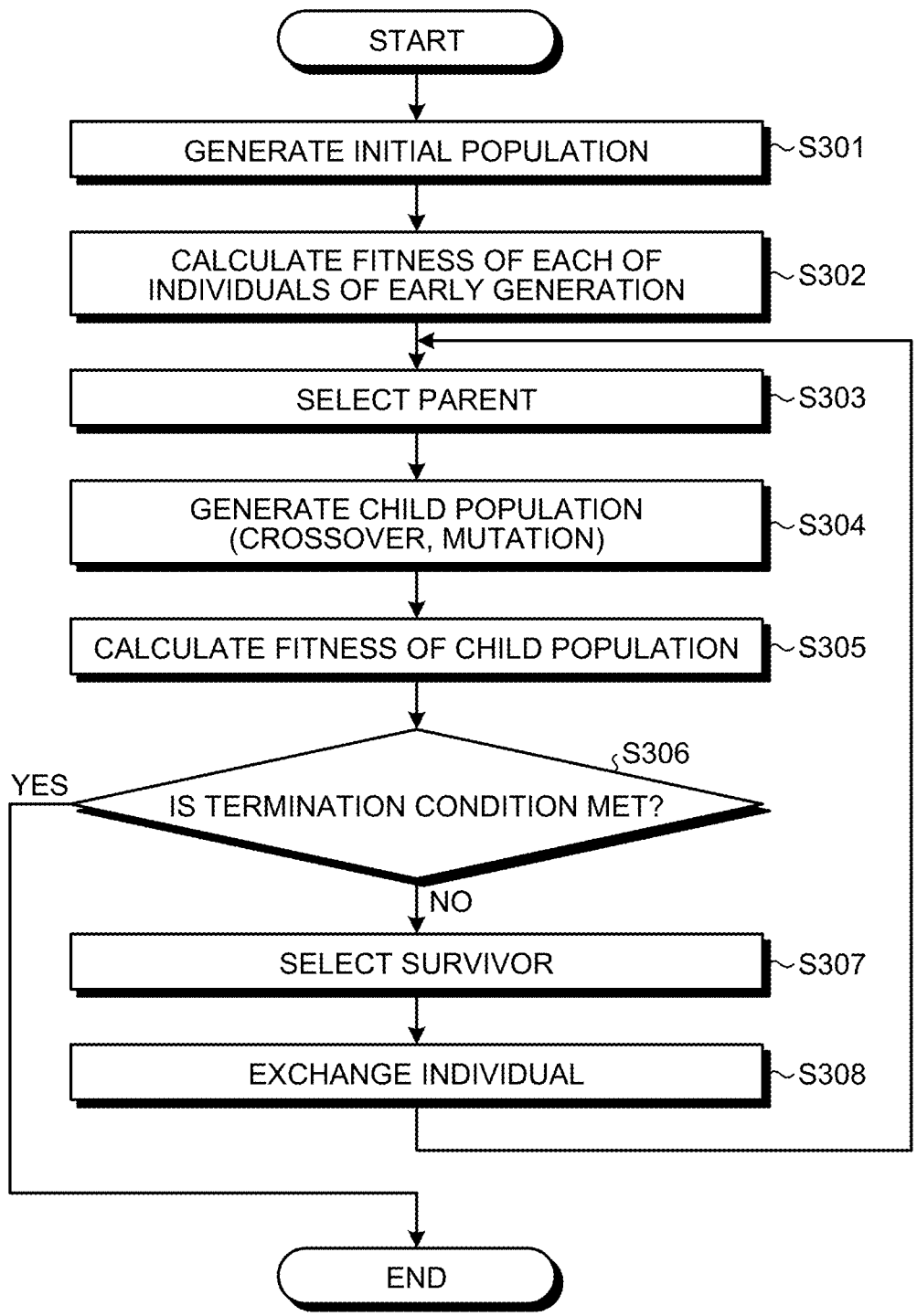
FIG. 27 is a flowchart for explaining an example of a process performed by the parameter determination apparatus.

FIG. 27 is a flowchart for explaining an example of a process performed by the parameter determination apparatus 30. As illustrated in FIG. 27, the parameter determination apparatus 30 generates an initial population at Step S301, and calculates fitness of each of individuals of an early generation at Step S302. Subsequently, the parameter determination apparatus 30 selects a parent based on the fitness at Step S303. The parameter determination apparatus 30 selects, for example, two parents. Then, at Step S304, the parameter determination apparatus 30 generates a child population by using the selected parents. The parameter determination apparatus 30 generates the child population by performing crossover or mutation.

Subsequently, the parameter determination apparatus 30 calculates fitness of the child population at Step S305, and determines whether the termination condition is met at Step S306. Further, if the termination condition is not met, the parameter determination apparatus 30 selects a survivor at Step S307, exchanges an individual of a current generation based on the selected survivor at Step S308, and returns to Step S303. In contrast, if the termination condition is met, the parameter determination apparatus 30 terminates the process.

As described above, in the embodiment, the serial number recognition program is parameterized. Further, the generation unit 31 generates the parameter set of the serial number recognition program, and the identification unit 32 identifies the character present regions by simulation using the parameter set that is generated by the generation unit 31. Furthermore, the evaluation index calculation unit 33 calculates the fitness $f_{total}$ of the parameter set based on the character present regions identified by the identification unit 32. Moreover, the generation unit 31 selects a parent based on the fitness $f_{total}$ and generates a child population by using crossover or mutation. The parameter determination apparatus 30 repeats the processes performed by the generation unit 31, the identification unit 32, and the evaluation index calculation unit 33 until the predetermined termination condition is met, and optimizes the parameter set. Therefore, the parameter determination apparatus 30 is able to eliminate trial and error for determining the optimal parameter set, so that it is possible to reduce man-hours needed to develop the serial number recognition program.

Furthermore, in the embodiment, the evaluation index calculation unit 33 calculates the fitness $f_{total}$ based on the number of characters, the character spacing, and the character string width, so that it is possible to appropriately evaluate the parameter set.

Moreover, in the embodiment, the parameter set includes the binarization threshold TH1, the binarization type BTYPE, the dilation amount DPXL, the black-to-white ratio threshold THR, the outer edge designation UDLR for removing a candidate at the edge of the serial number present region image, the X-distance threshold THX, and the Y-distance threshold THY. Therefore, the parameter determination apparatus 30 is able to optimize the serial number recognition program.

Meanwhile, while the parameter determination apparatus 30 is explained in the embodiment, it is possible to implement the parameter determination program with the same functions by implementing the configurations of the parameter determination apparatus 30 by software. Therefore, a computer that executes the parameter determination program will be described below.

Figure 28:
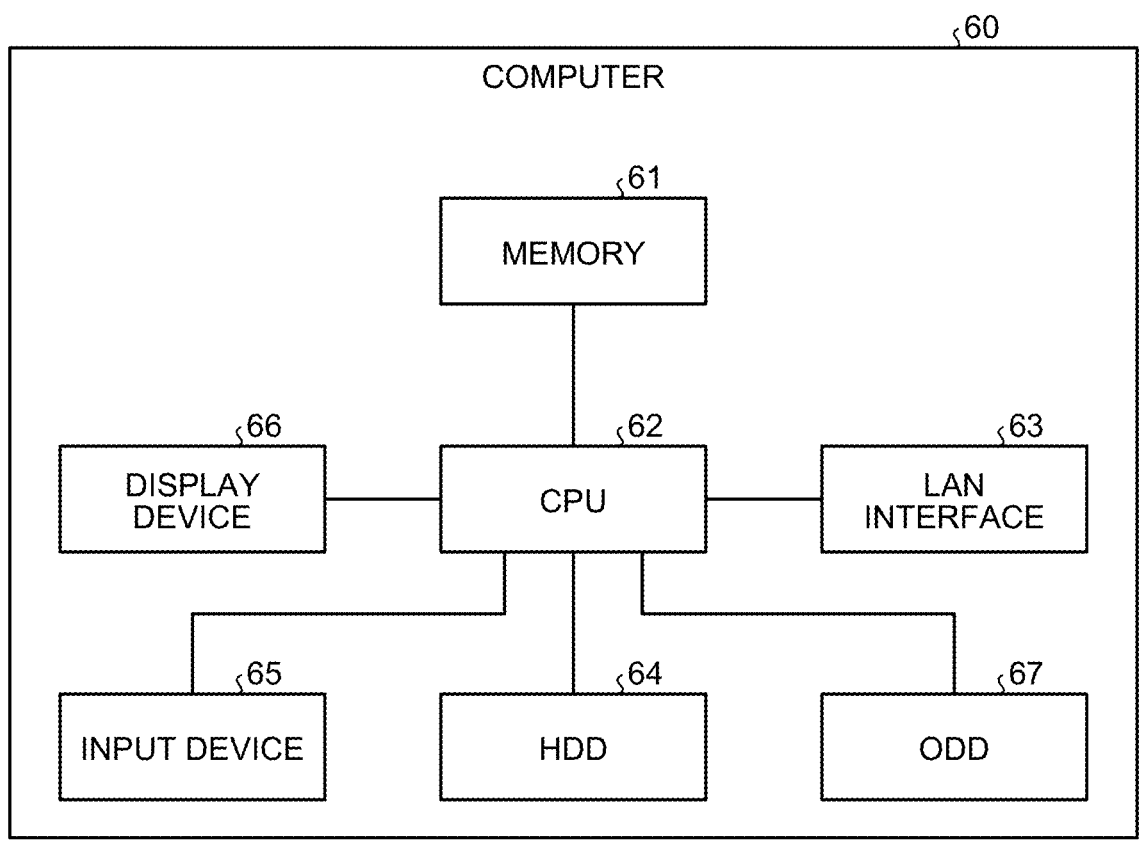
FIG. 28 is a diagram illustrating a hardware configuration of a computer that implements a parameter determination program according to the embodiment.

FIG. 28 is a diagram illustrating a hardware configuration of the computer that executes the parameter determination program according to the embodiment. As illustrated in FIG. 28, a computer 60 includes a memory 61, a CPU 62, a Local Area Network (LAN) interface 63, and a Hard Disk Drive (HDD) 64. Furthermore, the computer 60 includes an input device 65, a display device 66, and an Optical Disk Drive (ODD) 67.

The memory 61 is a RAM for storing a program, an interim result of the program, and the like. The CPU 62 is a central processing device that reads the program from the memory 61 and executes the program. The CPU 62 includes a chipset including a memory controller.

The LAN interface 63 is an interface for connecting the computer 60 to a different computer via a LAN. The HDD 64 is a disk device for storing therein a program and data, and the input device 65 is a mouse, a keyboard, or the like. The display device 66 is a liquid crystal display device, and the ODD 67 is a device for performing reading and writing with respect to a digital versatile disk (DVD).

Furthermore, the parameter determination program executed by the computer 60 is stored in a DVD that is one example of a recording medium that is readable by the computer 60, is read from the DVD by the ODD 67, and installed in the computer 60. Alternatively, the parameter determination program is stored in a databased or the like of a different computer system that is connected via the LAN interface 63, is read from the database, and is installed in the computer 60. Moreover, the installed parameter determination program is stored in the HDD 64, is loaded onto the memory 61, and is executed by the CPU 62.

Meanwhile, while the paper currency handling apparatus 1 is explained in the embodiment, the present invention is similarly applicable to a different paper sheet handling apparatus that handles a paper sheet including a character string that is similar to the serial number. Furthermore, while the parameter set is optimized by using the GA in the embodiment, the parameter determination apparatus may optimize the parameter set by using a different optimization method.

According to one aspect, the present invention is able to reduce man-hours needed to develop a serial number recognition program.

What is claimed is:

1. A parameter set optimization apparatus comprising:
a processor, wherein the processor executes:
    a first generation process that generates a parameter set of a program by using a Genetic Algorithm, the program being used when character present regions in which characters that form a serial number are present are identified,
    an identification process that identifies, from an image of a paper sheet, the character present regions by using the generated parameter set,
    a first calculation process that calculates a first evaluation value related to the number of characters in the identified character present regions, a second evaluation value related to character spacing in the identified character present regions, and a third evaluation value related to a character string width in the identified character present regions,
    a second calculation process that calculates a fitness of the parameter set based on the first evaluation value, the second evaluation value and the third evaluation value,
    a determination process that determines a parent parameter set of the Genetic Algorithm based on the calculated fitness,
    a second generation process that generates a child parameter set of the Genetic Algorithm by performing crossover and mutation to the parent parameter set, and
    an optimization process that optimizes the parameter set by repeating the identification process, the first calculation process and the second calculation process until a predetermined termination condition is met when the number of generations of the Genetic Algorithm reaches a predetermined value.

2. The parameter set optimization apparatus according to claim 1, wherein the parameter set includes a value that indicates a binarization type used when a serial number region image including the serial number is binarized, a binarization threshold, a value indicating a dilation amount in a dilation process performed on a binarized character present region, a black-to-white ratio threshold that is used when excluding a character present region in which a predetermined percentage or more of black pixels are present from among binarized character present regions, outer edge designation that is used when excluding the character present region that is located within a first predetermined distance from an outer edge of a binarized serial number region image, and a distance threshold that is used when excluding a character present region for which a distance from an adjacent character present region is equal to or larger than a predetermined distance.

3. A non-transitory computer-readable recording medium having stored therein a parameter set optimization program that causes a computer to execute a processes, the processes comprising:
    a first generation process that generates a parameter set of a program by using a Genetic Algorithm, the program being used when character present regions in which characters that form a serial number are present are identified;
    an identification process that identifies, from an image of a paper sheet, the character present regions by using the generated parameter set;
    a first calculation process that calculates a first evaluation value related to the number of characters in the identified character present regions, a second evaluation value related to character spacing in the identified character present regions, and a third evaluation value related to a character string width in the identified character present regions;
    a second calculation process that calculates a fitness of the parameter set based on the first evaluation value, the second evaluation value and the third evaluation value;
    a determination process that determines a parent parameter set of the Genetic Algorithm based on the calculated fitness;
    a second generation process that generates a child parameter set of the Genetic Algorithm by performing crossover and mutation to the parent parameter set; and
    an optimization process that optimizes the parameter set by repeating the identification process, the first calculation process and the second calculation process until a predetermined termination condition is met when the number of generations of the Genetic Algorithm reaches a predetermined value.

4. A paper sheet handling system comprising:
a paper sheet handling apparatus that, by executing a program, identifies, from an image of a paper sheet, character present regions in which characters that form a serial number are present; and
a parameter set optimization apparatus that optimizes a parameter set of the program, wherein
the parameter set optimization apparatus includes a processor, wherein the processor executes:
    a first generation process that generates the parameter set by using a Genetic Algorithm;
    an identification process that identifies, from an image of the paper sheet, the character present regions by using the generated parameter set;
    a first calculation process that calculates a first evaluation value related to the number of characters in the identified character present regions, a second evaluation value related to character spacing in the identified character present regions, and a third evaluation value related to a character string width in the identified character present regions,
    a second calculation process that calculates a fitness of the parameter set based on the first evaluation value, the second evaluation value and the third evaluation value;

a determination process that determines a parent parameter set of the Genetic Algorithm based on the calculated fitness;

a second generation process that generates a child parameter set of the Genetic Algorithm by performing crossover and mutation to the parent parameter set; and an optimization process that optimizes the parameter set by repeating the identification process, the first calculation process and the second calculation process until a predetermined termination condition is met when the number of generations of the Genetic Algorithm reaches a predetermined value.

* * * * *